Jan. 21, 1930.  N. H. F. OLSEN  1,744,667

BUMPER CLAMP

Filed Dec. 7, 1928

INVENTOR
Niels H. F. Olsen
BY C. R. Halbert,
E. L. Davis.
ATTORNEYS.

Patented Jan. 21, 1930

1,744,667

UNITED STATES PATENT OFFICE

NIELS H. F. OLSEN, OF DETROIT, MICHIGAN

BUMPER CLAMP

Application filed December 7, 1928. Serial No. 324,529.

The object of my invention is to provide a bumper clamp of simple, durable and inexpensive construction.

A further object of my invention is to provide a bumper clamp which may be clamped between a pair of automobile bumper bars to secure the same in alignment with each other.

Still a further object of my invention is to provide a bumper clamp which may be easily applied to an automobile bumper and when applied will be positively aligned therewith and prevented from accidental displacement.

With these and other objects in view my invention consists in the arrangement, combination, and construction of the various parts of my improved device as described in the specification, claimed in the claims, and illustrated in the accompanying drawings in which:

Figure 1:
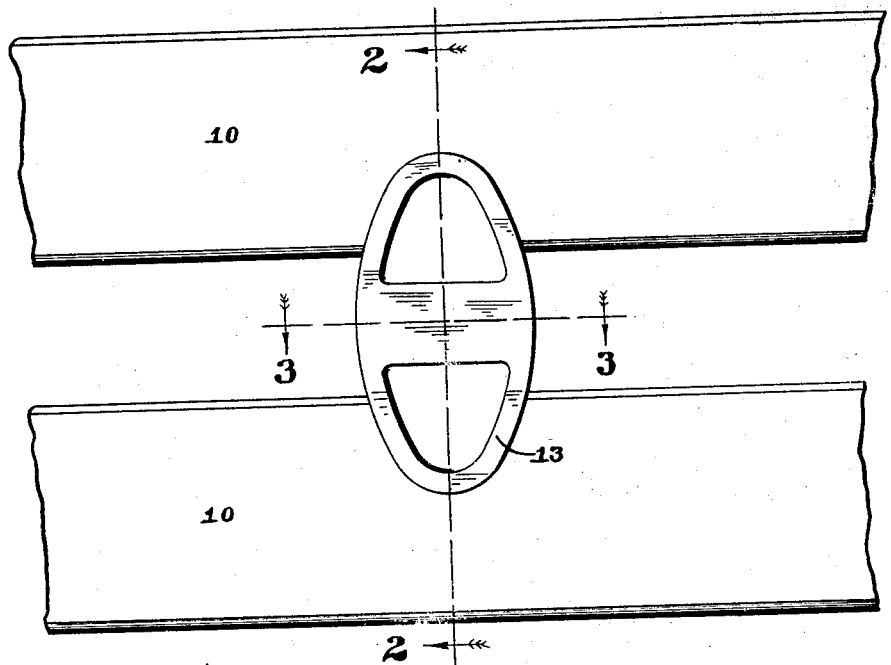
Figure 1 is a front elevation of my improved device.
Figure 2:
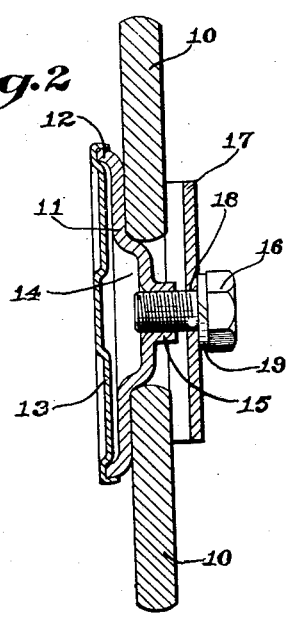
Figure 2 is a sectional view taken on the line 2—2 of Figure 1.
Figure 3:
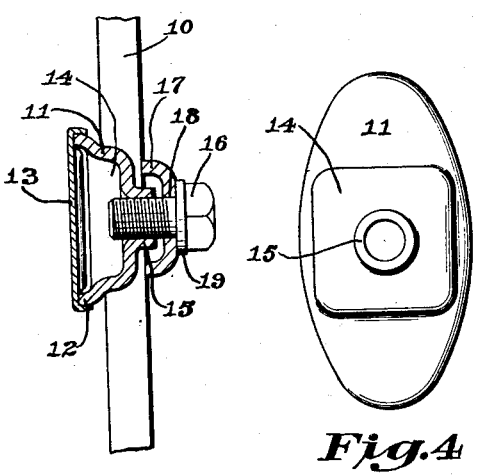
Figure 3 is a sectional view taken on the line 3—3 of Figure 1.
Figure 4:
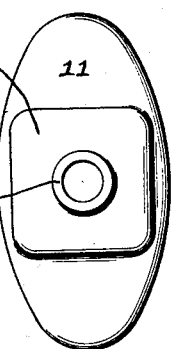
Figure 4 is a rear view of the front plate, the clamping bolt and rear clamping plate being removed to better illustrate the construction.

Referring to the accompanying drawings, I have used the reference numeral 10 to indicate generally a pair of spaced bumper bars commonly used with an automobile. It is common practice to clamp the bumper bars together midway between the ends so that a force applied to one bar at the center will be distributed over both of the bumper bars. Due to the prominent position in which such bumper clamps are placed, it is necessary that the clamps have a pleasing appearance and it is preferable that they have a high luster finish to match the bumper bars with which they are associated.

In my improved construction, a front clamping plate 11 of oval shape has its outer edge or periphery extended forwardly so that this outer edge may be used for securing an ornamental cover plate 13 thereto. The cover plate 13 is preferably made from a light metal stamping of material which will readily take a plated or enameled finish and any suitable design may be embossed on it. The outer edge of the plate 13 is over the outer edge 12 of the plate 11 and is swedged over this outer edge by a die to permanently secure the plate 13 to the plate 11 so that an appearance of depth will be given to the ornamental plate 13.

The plate 11 is provided with a square rearwardly extending depression 14 near its central part. This square depression is pressed from the material of the clamping plate and is used to position the clamp relative to the bumper bars. An integral sleeve 15 extends rearwardly from the center of the square depression 14 and is threaded to receive a clamping bolt 16. A rear clamping member 17 of channel section is provided with an opening 18 near its central part to receive the clamping bolt 16. A lock washer 19 may be used with the bolt 16 to prevent the bolt from shaking loose.

The method used to apply the clamp is to place the clamping plate and cover member unit against the front of the bumper bars with the square depression 14 extending rearwardly between the bars. The channel member 17 is then placed behind the bars and the bolt 16 is inserted in the opening 18 and screwed home into the threaded sleeve 15.

Among the many advantages arising from the use of my improved device it may be well to point out that I have secured a clamping device having those parts which are subject to a high stress made of suitable material and of large section while a comparatively light ornamental cover is provided to give a pleasing appearance to the assembly. Still a further advantage results in that my improved device can be quickly and permanently secured to the bumper bars of an automobile and will retain the bumper bars in permanent spaced relationship with each other.

Some changes may be made in the arrangement, construction, and combination of my improved device without departing from the spirit of my invention, and it is my intention to cover by my claims such changes as may reasonably be included within the scope thereof:

I claim as my invention:

1. In a device of the character described, a front clamping plate having a bumper bar spacing depression formed therein, an internally threaded sleeve secured to the bottom of the said depression, a rear clamping member, a bolt extending through the rear clamping member and co-acting with the said threaded sleeve to draw the front plate and rear clamping member together, and a cover member secured at its outer edge to the outer edge of the front clamping plate.

2. In a device of the character described, a front clamping plate having a rearwardly extending squared depression formed therein, an internally threaded rearwardly extending sleeve formed from the material of the said square depression, a channel shaped rear clamping member, a bolt extending through the said rear clamping member and co-acting with the said threaded sleeve to draw the front plate and rear clamping member together, and an ornamental cover plate having its outer edge swedged over the outer edge of the front clamping plate and disposed on the forward side of said clamping plate.

November 16, 1928.

NIELS H. F. OLSEN.